Aug. 17, 1965  R. H. HUNTER  3,201,331
PURIFICATION OF HYDROXYMETHYL FURFURAL
Filed Oct. 17, 1962
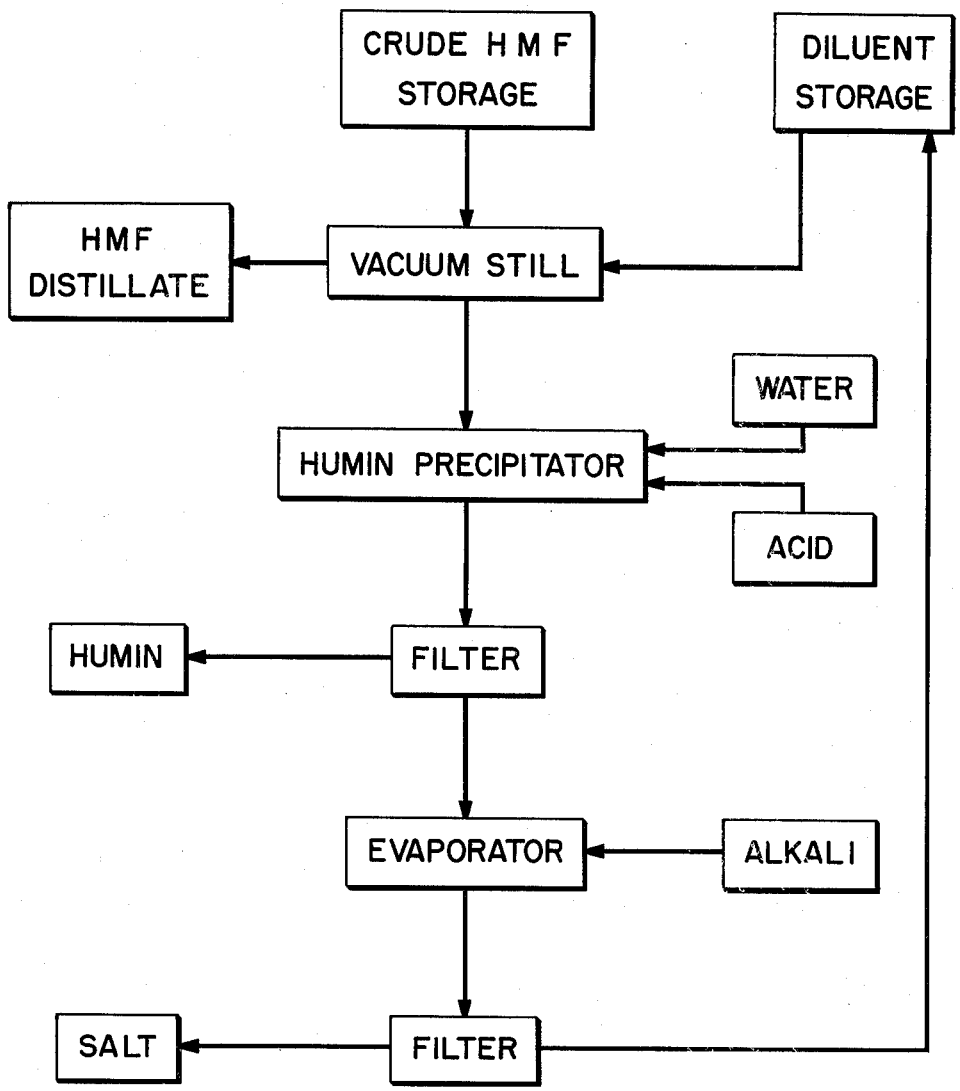
INVENTOR.
Robert H. Hunter 3,201,331
PURIFICATION OF HYDROXYMETHYL
FURFURAL
Robert H. Hunter, Mendenhall, Pa., assignor to Atlas Chemical Industries, Inc., Wilmington, Del., a corporation of Delaware
Filed Oct. 17, 1962, Ser. No. 231,286
7 Claims. (Cl. 202—39.5)

This invention relates to the recovery of hydroxymethyl furfural from mixtures and more particularly to an improved process for the purification of crude hydroxymethyl furfural by vacuum distillation.

The purification of crude hydroxymethyl furfural by distillation under reduced pressure has proved to be a troublesome operation because hydroxymethyl furfural and impurities associated therewith in the customary methods of synthesis form resinous, tarry and/or carbonaceous degradation products on long exposure to temperatures at which the sought product can be distilled at readily obtainable pressures. The exact chemical nature of these degradation products is unknown, and probably varies with the time-temperature-pressure conditions under which they are formed, but for convenience of reference they are generally called humin. Because of this indicated heat instability, it is virtually necessary, in distilling crude hydroxymethyl furfural, to utilize distillation apparatus where contact time of the crude distilland with the heating surface is minimized as, for example, a falling film vacuum still. Even in such an apparatus these is a tendency for deposits of resinous solids to form on the heating surface, to interfere with heat transfer and, in the case of apparatus equipped with a wiping blade, to stall the rotor. Frequent shut down to clean the surfaces is thus made necessary and the operation is rendered inefficient.

In accordance with the present invention these difficulties are overcome by distilling the impure hydroxymethyl furfural in admixture with a diluent which is non-volatile under the temperature-pressure conditions prevailing in the still, which diluent serves to fluidize the resinous thermal degradation products of the crude hydroxymethyl furfural and causes them to flow from the heating surface into a residue receiver. Distillation may continue for extended periods without shut down for cleaning of the still. The diluent may, if desired, be recovered from the still residue and recycled to the still for reuse. The diluent may conveniently be mixed with the crude hydroxymethyl furfural prior to its introduction into the still or, alterntively, be fed separately to the distillation apparatus in such manner that it is mixed with the crude hydroxymethyl furfural prior to, or in the first stages of, the distillation.

The liquid employed as a diluent in the process of the invention has a boiling point, under the pressure at which the distillation is to be carried out, at least 10° C. above that of hydroxymethyl furfural and is selected from the group consisting of:

(a) Polyethylene glycols; (b) block copolymers of ethylene and propylene oxides containing at least 50% by weight of ethylene oxide; (c) random copolymers of ethylene and propylene oxides containing at least 80% by weight of ethylene oxide; (d) polyoxyethylene adducts of organic compounds containing active hydrogen, said adducts containing not more than 7% by weight of non-oxygen bonded aliphatic radical; and (e) polyhydric alcohols containing at least 48% by weight of oxygen.

By "non-oxygen bonded aliphatic radical" in the foregoing definition and throughout this specification and in the appended claims is meant an aliphatic radical removed from oxygen by at least one carbon atom. Thus, in the alkoxy group $C_nH_{2n+1}O—$, the non-oxygen bonded aliphatic radical is $C_{n-1}H_{2n-1}$. Illustrative of the compounds coming within the scope of the above definition and suitable for use in the invention are tetraethylene glycol, hexaethylene glycol, the polyethylene glycol of average molecular weight 600 and commercially available under the trade name Carbowax 600, the mono- and dimethyl ethers of any of the foregoing glycols, the block copolymer of propylene and ethylene oxides containing approximately 60% ethylene oxide and available under the trade designation Pluronic P–66, the rendom copolymer of 80% by weight ethylene oxide and 20% by weight of propylene oxide initiated with water and polymerized to a molecular weight of 960, the polyoxyethylene ether of lauryl alcohol containing 50 oxyethylene groups per mol, the polyoxyethylene ether of phenol contain 4 oxyethylene groups per mol, the polyoxyethylene ether of paratertiary butyl phenol containing 15 oxyethylene groups per mol, the polyoxyethylene ether of triethanol amine containing 12 added oxyethylene groups per mol, glycerol, xylitol, sorbitol, and the like.

The amount of diluent to be added to the crude hydroxymethyl furfural fed to the distillation may be varied rather widely but should be at least 5% by weight of the crude hydroxymethyl furfural to insure that the formed resinous components will be sufficiently fluid to flow from the heating surfaces at distillation temperature. Somewhat larger amounts, i.e. from 15% to 100% by weight of the crude, are generally preferred. Excessive amounts of diluent, i.e. more than 100% by weight of the crude hydroxymethyl furfural, are fully operative in the process but are not necessary and are preferably avoided for economic reasons.

The mixture of crude hydroxymethyl furfural and diluent is fed to the still, preferably of the flash distillation type, operating suitably in the temperature range of from 130° to 180° C. at a pressure of less than 2 millimeters of mercury absolute. Hydroxymethyl furfural is vaporized and removed from the still body to be condensed and recovered. The residue solution of resinous thermal decomposition products in the added diluent flows from the heating surface into a residue receiver from which it is continuously or intermittently discharged.

If desired the diluent may be recovered for reuse in subsequent distillations as follows:

The residue solution is diluted with from 50% to 200% its own weight of water. The aqueous solution is acidulated to pH 3 with an inorganic acid which causes humins and related materials to precipitate. These are removed by filtration and the aqueous filtrate is neutralized with an inorganic alkaline compound. Water is evaporated from the neutralized solution and the dried diluent filtered free from precipitated salt. It is then ready for reuse in a subsequent distillation.

In the following examples, presented for illustrative purposes, specific embodiments of the invention are described.

The process of the invention is illustrated in the accompanying flow-sheet.

EXAMPLE I

The crude hydroxymethyl furfural employed was obtained by the acid catalyzed dehydration of high test molasses and had been preliminarily separated from residual sugar, organic acids and the bulk of the humin formed as by products of the reaction. Its hydroxymethyl furfural content, analyzed by ultraviolet absorption, was 85.9%. To 5 parts by weight of this crude material was added one part of a commercial polyethylene glycol (Carbowax 600) having an average molecular weight of about 600. The mixture was diluted with a little water (to approximately 15% water content), its pH adjusted to 7.6 with 10% sodium hydroxide solution, and vacuum stripped to dryness at 30–35° C. and 1–2 mm. pressure.

The dried product was then distilled in a falling film type vacuum still (laboratory Vacu-Film Processor, L-28 VF by Rodney Hunt Machine Co.) at an absolute pressure of 0.05 to 0.5 millimeters of mercury and with a wall temperature ranging from 134–170° C. The mixture was fed at a rate of 74 grams per hour and the rotor speed controlled so that the residence time in the still was between 1 and 2 minutes. The distillate, an orange colored liquid, analyzed 85.3% hydroxymethyl furfural by ultraviolet absorption. The residue, totalling 34% on the weight of the crude hydroxymethyl furfural, was a black, very viscous liquid which flowed readily from the still into the residue receiver.

The residue was diluted with water, acidulated to pH 3 with dilute sulfuric acid and filtered. The dried filter cake (humin) amounted to 11.5% by weight calculated on the crude hydroxymethyl furfural taken. The filtrate after neutralization with sodium hydroxide, evaporation to dryness and filtration of precipitated sodium sulfate yielded 22.5% by weight, based on the crude hydroxymethyl furfural, of recovered polyglycol.

EXAMPLE II

The polyglycol recovered in Example I was added to the same weight of the same crude hydroxymethyl furfural employed in Example I and put through essentially the same process. In this second distillation the analyzed hydroxymethyl furfural content of the distillate was 97.1%. From the residue the separation and recovery process yielded 11.6% humin and 20.9% polyglycol, each based on the weight of crude hydroxymethyl furfural.

EXAMPLE III

A crude hydroxymethyl furfural from a high test molasses conversion product and analyzing 77.9% hydroxymethyl furfural was diluted with its own weight of Carbowax 600, neutralized, dried, and distilled in the apparatus and under the conditions described in Example I. The residue was somewhat less viscous than that in Example I and flowed from the heating surface into the residue receiver quite freely. The distilled product analyzed 100% hydroxymethyl furfural by U.V. absorption.

It was attempted to distill another portion of the same crude hydroxymethyl furfural in the same still under the same operating conditions but without addition of Carbowax 600. A solid carbonaceous residue began forming on the sides of the still and built up in a short time to an extent that the rotor stalled and the distillation had to be stopped.

EXAMPLE IV

Another portion of the crude hydroxymethyl furfural employed in Example III was distilled under all of the conditions described in that example with the exception that only 50% by weight (based on hydroxymethyl furfural) of the polyglycol was added. The distillate purity was 99.1% and the residue flowing from the still was a viscous black liquid.

A number of different diluents were employed as replacements for the polyethylene glycol of average molecular weight 600 in the process of Example I. The results are presented in Table I.

*Table I*

| Example No. | Diluent | Distillate Purity, percent | Residue Appearance |
|---|---|---|---|
| V | Polyethylene Glycol, M.W. 400. | 96.5 | Black, more fluid than in Ex. I. |
| VI | Polyethylene Glycol, M.W. 1,000. | 99.3 | Flowed from still, set solid at room temp. |
| VII | Dimethyl Ether of Polyglycol 600. | 97.1 | Black liquid flowed readily. |
| VIII | 30-Polyoxyethylene Sorbitol. | 94.6 | Very viscous black liquid. |

In another series of distillations a crude hydroxymethyl furfural of 91.4% purity was employed with the diluents shown in tabular form below. In each case, unless otherwise noted, 33 parts of the diluent was admixed with 100 parts of the crude hydroxymethyl furfural and the pH adjusted with NaOH to 7.6–7.7 in aqueous solution of 90% concentration. The distillation was carried out in the apparatus described in Example I in the temperature range of 125–190° C. and in the pressure range of 0.05 to 0.20 millimeter of mercury. In every case the purity of the distillate was higher than 96% and the appearance of residue and still were as shown in the table.

*Table II*

| Example No. | Diluent | Feed Rate, g./hr. av. | Residue and Still Appearance |
|---|---|---|---|
| IX | Polyethylene Glycol, M.W. 600. | 169 | Black, viscous; rotor and still wall clean. |
| X | Phenyl ether of tetraethylene glycol. | 200 | Do. |
| XI [1] | Adduct of triethanol amine+12 mols ethylene oxide. | 204 | Do. |
| XII | Adduct of lauryl alcohol+50 mols ethylene oxide. | 136 | Black, semi-solid; Trace of solids on rotor and still walls. |
| XIII | Block copolymer of 60% ethylene oxide-40% propylene oxide, M.W. 4375. | 207 | Semi-solid at 25° C., Rotor and still walls clean. |
| XIV | Random copolymer of 80% ethylene oxide-20% propylene oxide M.W. 975. | 156 | Viscous liquids; small amount of solids on rotor and still walls. |
| XV | Sorbitol | 175 | Flows from still, solid at room temperature; Still walls and rotor clean. |

[1] No NaOH added, pH=9.2.

What is claimed is:

1. In the purification of hydroxymethyl furfural by vacuum distillation the improvement of distilling the impure hydroxymethyl furfural in admixture with at least 5% of its own weight of a diluent having a boiling point, under the pressure at which said vacuum distillation is conducted, at least 10° C. greater than that of hydroxymethyl furfural, and selected from the group consisting of:
   (a) polyethylene glycols;
   (b) block copolymers of ethylene and propylene oxides containing at least 60% by weight ethylene oxide;
   (c) random copolymers of ethylene and propylene oxides containing at least 80% by weight of ethylene oxide;
   (d) polyoxyethylene adducts of organic compounds containing active hydrogen, said adducts containing not more than 7% by weight of non-oxygen bonded aliphatic radical; and
   (e) polyhydric alcohols containing at least 48% by weight of chemically combined oxygen.

2. The process of claim 1 wherein the said diluent is a polyethylene glycol.

3. The process of claim 2 wherein the amount of said polyethylene glycol is from 15% to 100% of the weight of impure hydroxymethyl furfural.

4. The process of claim 2 wherein the average molecular weight of polyethylene glycol is between about 400 and about 1000.

5. In the purification of hydroxymethyl furfural by vacuum distillation the improvement of distilling the impure hydroxymethyl furfural in admixture with at least 5% of its own weight of a diluent having a boiling point, under the pressure at which said vacuum distillation is conducted at least 10° C. greater than that of hydroxymethyl furfural, and selected from the group consisting of:
   (a) polyethylene glycols;

(b) block copolymers of ethylene and propylene oxides containing at least 60% by weight ethylene oxide;

(c) random copolymers of ethylene and propylene oxides containing at least 80% by weight of ethylene oxide;

(d) polyoxyethylene adducts of organic compounds containing active hydrogen, said adducts containing not more than 7% by weight of non-oxygen bonded aliphatic radical; and (e) polyhydric alcohols containing at least 48% in weight of chemically combined oxygen;

and recovering said diluent from the still residue.

6. The process of claim 5 wherein the process for recovering said diluent comprises:

(a) diluting the still residue with from 50% to 200% of its own weight of water;

(b) acidulating the diluted aqueous mixture to pH 3 with an inorganic acid to precipitate humins and related materials;

(c) filtering to remove the precipitated humins and related materials;

(d) neutralizing the resulting filtrate with an inorganic alkaline compound to form the salt of the said inorganic acid;

(e) evaporating the water from the solution to precipitate the said salt; and (f) filtering the salt from the resulting diluent.

7. The process of claim 6 wherein the said diluent is a polyethylene glycol.

References Cited by the Examiner

UNITED STATES PATENTS

| | | | |
|---|---|---|---|
| 2,498,918 | 2/50 | Haworth | 260—347.8 |
| 2,750,394 | 6/56 | Peniston | 260—347.8 |
| 2,917,520 | 12/59 | Cope | 260—347.8 X |
| 2,929,823 | 5/60 | Garber | 260—347.8 |
| 2,994,645 | 8/61 | Jones et al. | 202—52 X |
| 3,071,599 | 1/63 | Hales et al. | 260—347.8 |

NORMAN YUDKOFF, *Primary Examiner.*

UNITED STATES PATENT OFFICE
CERTIFICATE OF CORRECTION

Patent No. 3,201,331                              August 17, 1965

Robert H. Hunter

It is hereby certified that error appears in the above numbered patent requiring correction and that the said Letters Patent should read as corrected below.

Column 2, line 10, for "rendom" read -- random --; column 3, line 9, for "85.3%" read -- 95.3% --.

Signed and sealed this 26th day of April 1966.

(SEAL)
Attest:

ERNEST W. SWIDER
Attesting Officer

EDWARD J. BRENNER
Commissioner of Patents